United States Patent
Hop et al.

(10) Patent No.: US 9,027,410 B2
(45) Date of Patent: *May 12, 2015

(54) HERMETICALLY GLASS SEALED PRESSURE SENSOR

(75) Inventors: Erik Hop, Apeldoorn (NL); Gerard Klaasse, Apeldoorn (NL); Rob Slakhorst, Almelo (NL); Wico Hopman, Enschede (NL); Arnout van den Bos, Deurningen (NL)

(73) Assignee: Sensata Technologies, Inc., Attleboro, MA (US)

( * ) Notice: Subject to any disclaimer, the term of this patent is extended or adjusted under 35 U.S.C. 154(b) by 236 days.

This patent is subject to a terminal disclaimer.

(21) Appl. No.: 13/615,764

(22) Filed: Sep. 14, 2012

(65) Prior Publication Data

US 2014/0076059 A1 Mar. 20, 2014

(51) Int. Cl.
*G01L 7/00* (2006.01)
*G01L 19/04* (2006.01)
*G01L 19/14* (2006.01)

(52) U.S. Cl.
CPC ............... *G01L 19/04* (2013.01); *G01L 19/147* (2013.01); *Y10T 156/10* (2013.01)

(58) Field of Classification Search
USPC .................................................. 73/700–756
See application file for complete search history.

(56) References Cited

U.S. PATENT DOCUMENTS 7,518,234 B1 * 4/2009 Okojie ........................... 257/710
7,726,197 B2 * 6/2010 Selvan et al. .................. 73/777
7,775,119 B1 * 8/2010 Suminto et al. ................ 73/727
8,215,176 B2 * 7/2012 Ding et al. ...................... 73/721
8,627,559 B2 * 1/2014 Suminto et al. ................ 29/595
2003/0150275 A1 8/2003 Wagner et al.
2008/0222884 A1 9/2008 Bradley et al.
2009/0071260 A1 3/2009 Speldrich

FOREIGN PATENT DOCUMENTS

EP 1826543 A2 8/2007

OTHER PUBLICATIONS

European Search Report from EP application No. 13184454.0, Jan. 14, 2014, total pp. 2.
Extended European Search Report, Application No. 13184454.0, Feb. 14, 2014, pp. 4.

* cited by examiner

*Primary Examiner* — Andre Allen
(74) *Attorney, Agent, or Firm* — Chapin IP Law, LLC

(57) ABSTRACT

Techniques disclosed herein include systems and methods for pressure measurement of fluids including vehicular fluids. The pressure sensor includes a microelectromechanical system (MEMS) sensor for pressure measurement. The MEMS sensor is attached to a glass tube which is compressively sealed to a mounting frame that is attachable to a pressure port of a fluid-containing enclosure. Techniques disclosed herein provide an hermetic seal between the tube and the mounting frame and a rigid seal between the MEMS sensor to a pressure sensor while decoupling thermal expansion stress from the MEMS sensor. With such decoupling techniques, pressure sensing reliability and accuracy can be improved because thermal expansion stress is decoupled from the MEMS sensor. Such techniques provide an accurate, durable, and cost-effective pressure sensor.

26 Claims, 4 Drawing Sheets

HERMETICALLY GLASS SEALED PRESSURE SENSOR

RELATED APPLICATIONS

This application is related to U.S. patent application entitled "PRESSURE SENSOR," Ser. No. 13/615,783 filed on the same date herewith. The entire teachings and contents of this patent application are hereby incorporated by reference herein in its entirety.

BACKGROUND

The present disclosure relates to pressure sensor devices, and particularly to devices that identify changes in fluid pressure.

Pressure sensors typically measure absolute or relative pressure of fluids such as gasses or liquids. Measurement of fluids enables accurate control and monitoring of various devices and systems. There are various sensor devices using any of multiple available mechanisms of action for measuring pressure. For example, given sensor devices can use piezoelectric, piezoresistive, optical, electromagnetic, and other technologies for measuring pressure. Some pressure sensors are being manufactured at very small sizes. For example, microelectromechanical systems (MEMS) are now being used as pressure sensors. The main function of a MEMS sensor is to transfer a pressure signal into an electrical output signal based on an absolute or differential pressure input combined with offering an electrical base signal. Such relatively small pressure sensors are useful in systems where size and weight are valid considerations.

Conventional mid-pressure pressure sensors use metal alloy pedestals bonded to a MEMS die using a strong and stiff epoxy or eutectic bonding. Such metal alloy use is expensive and can compromise accuracy because of a significant difference in coefficient of thermal expansion values between the metal alloy material and the MEMS die. Conventional MEMS dies can also be manufactured with an integrated glass pedestal attached to the MEMS die during the wafer fabrication process. Such integrated glass pedestals (also referred to as fused glass pedestals) are relatively expensive, and the MEMS die is conventionally bonded to the glass pedestal using anodic bonding techniques, and the pedestal is bonded to a pressure port mounting frame by a bond or eutectic metal bond.

In conventional devices chemically resistant epoxy or eutectic bonding must provide mechanical bonding strength and a sufficient seal for transmission applications. It is difficult to provide cost effective, chemically robust and mechanically strong solutions, when components and adhesives are in contact with harsh media such as fuels, transmission fluids and oil.

Using MEMS technology in pressure sensing technologies can be beneficial because of the small footprint of MEMS devices relative to conventional pressure sensing technologies. As such, MEMS devices are suitable for applications having size constraints such as automotive transmissions including dual clutch transmission (DCT) systems with increasing requirements for smaller sensors. A challenge with MEMS pressure sensing devices, however, is creating a cost-efficient as well as a robust assembly or package. Conventional MEMS pressure sensors can be relatively expensive and lose accuracy or even fail under certain operating conditions including high temperature, thermal expansion, and chemical deterioration. For example, conventional MEMS pressure sensors are costly due to the number and type of parts, and the use of precious metals such as gold for improving bonding capabilities. A MEMS sensing element should be sealed chemically from a sensed media (such as fluid or oil pressure). Also, with conventional components made of varied materials, there is a mismatch in coefficients of thermal expansion (CTE). The result of such a mismatch is that thermal conditions can break down a chemical seal due to thermal stress build-up and/or apply excessive expansive stress to a MEMS sensing element.

One challenge with using MEMS pressure sensing elements is determining how to attach a MEMS die to a substrate to result in a sufficiently strong connection (physical attachment), but while enabling accurate pressure readings. A strong mechanical connection and good accuracy can conflict when thermal expansion coefficients of the components are not matched. With a strong connection there is always a corresponding level of stress that can be undesirable. For example, temperature changes at either relatively high or low temperatures can induce stress on a MEMS die attachment bond. A rigid connection translates these stresses to the die, affecting accuracy of pressure measurement.

SUMMARY

Techniques disclosed herein provide a strong connection of the MEMS die to a pressure sensor but while decoupling thermal expansion stress from the MEMS die. With such decoupling techniques, pressure sensing accuracy can exceed 99%. For example, techniques herein can use a tube having a fluid conduit, and instead of chemically bonding a metal pedestal to a mounting plate, the tube is held in place mechanically using a compressive glass seal. A portion of the tube is accessible from an exterior side of the mounting frame, or, alternatively, a portion of the tube protrudes from the mounting frame to enable MEMS die attachment. The MEMS die can be affixed either directly to the tube or onto a separate pedestal which is that affixed to the tube. The MEMS die can then be attached to the tube using a glass paste or frit, for example, a low temperature melting glass (generally referred to as solder glass). This glass paste when heated forms a rigid seal with a thermal expansion match to the MEMS die and optional glass pedestal. With such a configuration, thermal expansion of the mounting frame is not a concern because the glass seal and other components remain in compression over operating temperatures and thus the mounting frame does not need to be selected from a material with a similar coefficient of thermal expansion of the MEMs die. With some techniques, the tube is inserted into the mounting frame and compressively sealed to the mounting frame to form an hermetic seal. In certain embodiments a low temperature melting glass (e.g., solder glass) is used to bond the MEMS die and a borosilicate tube. This bond forms a thermal expansion coefficient matched rigid seal. The seal between the borosilicate and the mounting frame of the pressure sensor is made in some embodiment using a compressive metal to glass seal. One advantage of using glass instead of epoxy to hold the MEMS element or borosilicate tube is that glass is more resistant against chemical attack from the fluids transmitting the pressure caused in part by permeation of solvents like ethanol or methanol.

One embodiment includes a pressure sensor device for measuring pressure of a fluid. The pressure sensor device has several components including a pressure port mounting frame the mounting frame having an interior side for facing the fluid-containing enclosure, the mounting frame having an exterior side for facing away from the fluid-containing enclosure, the mounting frame defining an opening that extends from the interior side to the exterior side, the mounting frame having a sidewall on the interior side, a tube defining a fluid conduit extending completely through the tube, the tube positioned such that the fluid conduit and a surface area of the tube, through which the fluid conduit exits, are accessible from the exterior side of the mounting frame. The device further includes a microelectromechanical system (MEMS) sensor sealed to the tube at a surface area of the tube such that when the fluid conduit is filled with fluid from the fluid-containing enclosure, the fluid presses against the MEMS sensor and an hermetic seal formed by compressively sealing the tube to the portion of the interior side of the mounting frame. Such a sensor is low cost, small size and robust sensor due to the compressive and matched thermal coefficient glass seals. Furthermore, the sensor provides an hermetic glass seal to protect the MEMS sensor. Applications of this sensor include but are not limited to: liquid fuel pressure sensing (LFS), Oil pressure sensing (OPS) and dual clutch transmission (DCT) hydraulic pressure sensing. The range of measured pressures in some application is about 0-10 bar or 0-70 bar, depending on the application.

One technique for assembling a pressure sensor for measure pressure of a fluid includes providing a mounting frame attachable to a pressure port of a fluid-containing enclosure, the mounting frame having an interior side for facing the fluid-containing enclosure, the mounting frame having an exterior side for facing away from the fluid-containing enclosure, the mounting frame defining an opening that extends from the interior side to the exterior side, positioning a tube at the opening, the tube defining a fluid conduit extending completely through the tube, the tube positioned such that the fluid conduit and a surface area of the tube, through which the fluid conduit exits, are accessible from the exterior side of the mounting frame, compressively bonding the tube (also referred to as sealing the tube) to the mounting frame forming a hermetic seal between the MEMS sensor and fluid-containing enclosure and sealing a microelectromechanical system (MEMS) sensor to the tube at the surface area of the tube such that when the fluid conduit is filled with fluid from the fluid-containing enclosure, the fluid presses against the MEMS sensor.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
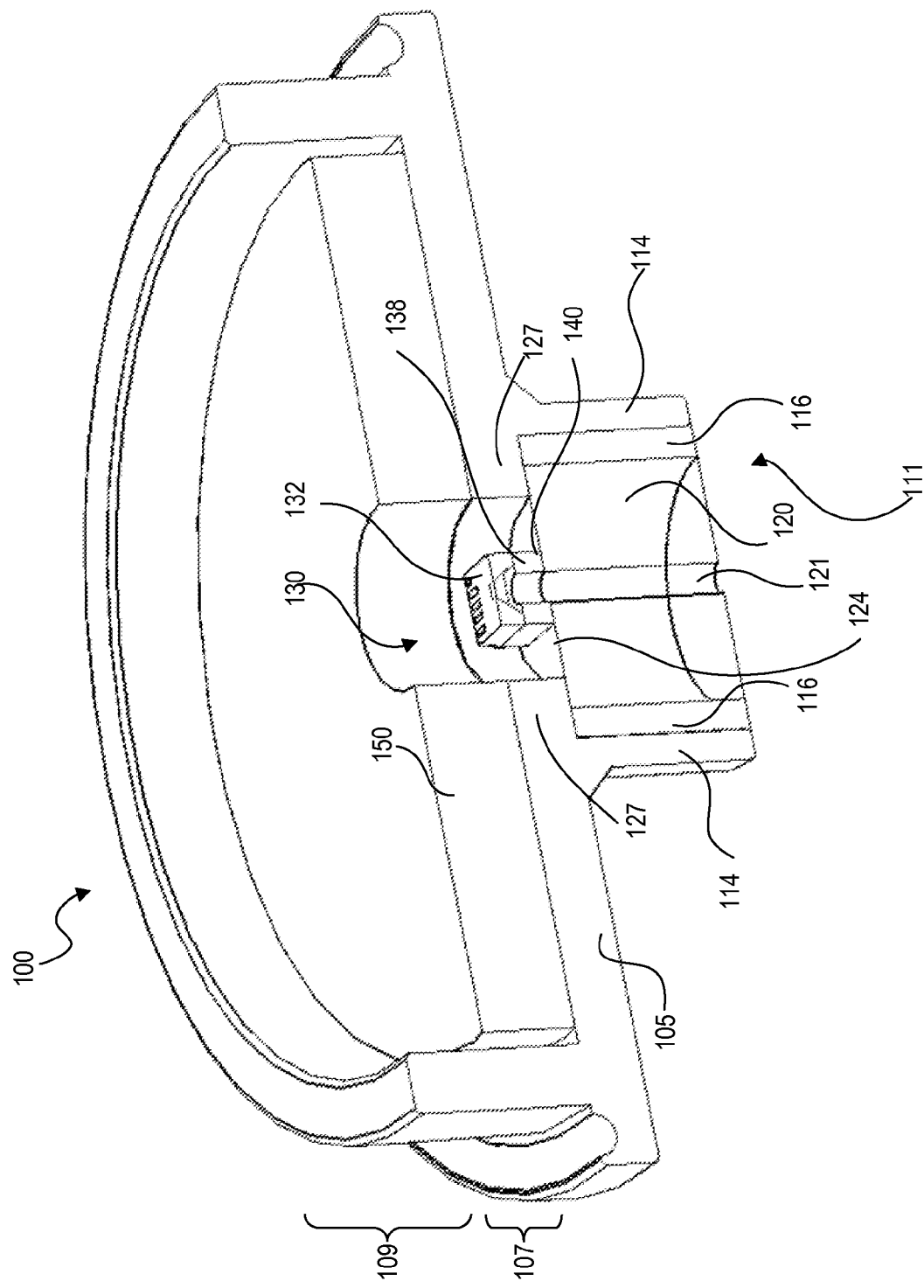
FIG. 1 is a cross-sectional side perspective view of a pressure sensor according to embodiments herein.

Techniques disclosed herein include systems and methods for a pressure sensor. Pressure sensors herein can be used for measuring various types of fluid media such as air, oil, water, fuel, etc. Embodiments herein are especially useful for measuring oil pressure in automotive transmissions including dual clutch transmissions (DCT). For convenience in explaining the various embodiments herein, this disclosure will primarily reference a sensor device for used with a DCT. Such an application, however, is not limiting and pressure sensors herein can apply to other applications as well, especially to applications where size of the sensor is a valid consideration. In a DCT, there is pressure stored in a pressure vessel (housing or enclosure) to change gears. With each gear change, pressure can drop. When pressure falls below a certain point the DCT needs to be pressurized again for better shifting.

For dual clutch transmission (DCT) applications, a relatively small pressure sensor is very beneficial, as are other aspects such as functionality, robustness and price. The inherently small footprint of a microelectromechanical systems (MEMS) die (electronic circuit) is beneficial to achieve a reduced-size sensor. For a very small (2×2 mm or smaller) sensing element, a significant challenge is to design and manufacture a robust assembly/package. Conventional pressure sensors using a MEMS sensing element typically use either a glass to metal solder bond or an epoxy to connect the MEMS element to a supporting assembly.

It has been discovered that a thermally matched seal (CTEs within approximately about 30%) employing solder glass (fired at approximately about 450° C.) can be used for sealing a borosilicate tube to both a MEMS die and a metallic mounting frame. If higher accuracies are needed, the matched seal can be even made better by introducing a common borosilicate pedestal, which is anodically bonded to the MEMS die, in one embodiment.

Techniques herein use using a solder glass bond forming a rigid seal to connect a borosilicate tube to a backside exposed MEMS die or to an optional additional glass pedestal coupled to the MEMS die. In some embodiments, relatively low-cost borosilicate glass tubes or blocks having tubes are used as an interface between the MEMS die and a pressure port. The metallic mounting frame is hermetically sealed to the tube. A hole in the mounting frame enables the MEMS die to protrude (or be exposed) while the mounting frame supports the tube. In such a configuration, the tube is compressively sealed to the mounting frame and such a seal is not dependent on the mechanical properties of epoxy or other adhesives Such techniques result in a pressure sensor that is more reliable than conventional pressure sensors (having a MEMS directly attached with epoxy to the port and using epoxy in contact with the mounting frame). Another advantage of such techniques is that the compressive seal can compensate for the mismatches in coefficients of thermal expansion between the tube and the mounting frame. The use of a metal (e.g., stainless steel) or metal alloy mounting frame material is advantageous because such material selection can be completely matched with a material counterpart or base plate of a given automotive transmission housing at a pressure point attachment location. In some embodiments, however, the seal layer can have a sufficient thickness to affect other components. In such embodiments, a coefficient of thermal expansion of the seal layer can be matched with that of the MEMS die, rigid seal, and the tube. Coefficients of thermal expansion are mentioned in (parts per million/degrees Kelvin) ppm/K. In another embodiment, an intermediate ceramic mounting frame is used.

With the mounting frame bonded to the tube, a matched glass seal can be used for bonding an optional pedestal assembly with a MEMS die to the tube. Alternatively the MEMS die can be bonded directly to the tube. The rigid seal being matched refers to coefficient of thermal expansion values being similar. For example, coefficient of thermal expansion values of the rigid seal and tube can be within 10% difference of each other. The MEMS die also includes a coefficient of thermal expansion value within about 30% of the rigid seal and the tube. This is a significant benefit because conventional metal alloy pedestals can have a coefficient of thermal expansion value that differs from the MEMS die by more than 50% or 100%.

Referring now to FIG. 1, a cross-sectional side view of an example pressure sensor device 100 for measuring pressure of a fluid is shown. A pressure port mounting frame 105 is attachable to a pressure port of a fluid-containing enclosure. The fluid-containing enclosure and corresponding pressure port are not shown. The fluid containing enclosure can be an automotive transmission housing, fluid tank, etc. Example fluids can be gasses or liquids including oils. The mounting frame 105 has an interior portion or interior side 107 for facing the fluid-containing enclosure. The mounting frame 105 has an exterior side 109 that faces away from the fluid-containing enclosure (or port of the fluid containing enclosure) when the pressure sensor 100 is mounted to the fluid containing enclosure. The mounting frame 105 defines an opening 111 that extends from the interior side 107 to the exterior side 109. As shown in FIG. 1, the opening 111 is defined as part of a recessed portion of mounting frame 105. Note that such a configuration is not limiting and the opening can be flush or inline with the mounting frame 105, that is, with no recessed portion. In alternative embodiments, the mounting frame 105 can include a support structure that extends above the interior side 107 to form a bracket or socket or lateral support.

Note that the mounting frame being attachable to a pressure port can be either directly attached or indirectly attached. For example, the pressure sensor can include a threaded section and/or be contained or nested within a housing that physically attaches to the pressure port or fluid-containing enclosure, while the pressure sensor assembly fits within a housing.

A tube 120 (also referred to as borosilicate tube 120) is positioned at the opening 111 and is in contact with a portion of interior side 107 of the mounting frame 105 such that the mounting frame 105 prevents the tube 120 from completely passing through the opening as if traveling from the interior side 107 towards to the exterior side 109. The tube 120 defines a fluid conduit 121 extending completely through the tube 120. The tube 120 is positioned such that the fluid conduit 121 and a surface area 124 of the tube 120 through which the fluid conduit exits are accessible from the exterior side 109 of the mounting frame 105. The tube can be created from one or more materials having a coefficient of thermal expansion that is close to a coefficient of thermal expansion of a microelectromechanical system (MEMS) sensor 130 including a MEMS die 132. By way of a non-limiting example, tube 120 can be made of glass and shaped with various geometries depending on a particular application. In the example figure, the tube 120 is shown as a cylindrical shape. Other geometries are possible that still provide sufficient material to define a fluid conduit 121 that can extend through the opening 111 when tube 120 is in contact with mounting frame 105.

The MEMS sensor 130 is attached to the tube 120 at the surface area 124 of the tube 120 such that when the fluid conduit 121 is filled with fluid from the fluid-containing enclosure (originating from the interior side 107); the fluid presses against the MEMS sensor 130. With fluid pressed against the MEMS sensor 130, the pressure sensor 100 can monitor and detect changes in fluid pressure. The MEMS sensor 130 can be attached to the tube 120 using a rigid seal 140. The rigid seal 140 includes an opening 141 (FIG. 2) where fluid can pass through and reach a portion of the MEMS die 132. The rigid seal 140 prevents fluid escaping around the MEMS die 132 and preventing fluid from exiting the pressure sensor device 100 on the exterior side 109 thereby preventing contamination. In one embodiment, the MEMS sensor 130 includes the MEMS die 132 which can be attached to an optional pedestal 138.

The tube 120 has a first coefficient of thermal expansion, the MEMS 130 sensor (i.e., the MEMS die 132) has a second coefficient of thermal expansion, and the rigid seal 140 has a third coefficient of thermal expansion. In one embodiment, wherein the first, second and third coefficients of thermal expansion are within about 0.75 ppm/K of each other, thereby having similar thermal expansion properties. The rigid seal 140 can be created from solder glass, eutectic bonding, anodic bonding, fusion bonding, or similar techniques. Solder glasses, also referred to as frit glasses, are special glasses with a particularly low softening point (below 550° C.). They are used to join glass to other glasses, ceramics, or metals without thermally damaging the materials to be joined. To ensure stress-free sealing, the coefficient of thermal expansion (CTE) needs to be closely matched to the MEMS sensor 130. In some embodiments, the CTE difference of the coefficients can be larger than 0.75 if the rigid seal 140 is thin.

Using solder glass (also referred to as frit glasses), the rigid seal 140 can be set by heating the components to around 450 degrees Celsius, which is much lower than the maximum temperature that the MEMS die 132 can withstand. The solder glass can be applied using a paste and/or dispensing or by screen printing. By using a borosilicate glass tube 120, the MEMS sensor 130 (i.e., the silicon MEMS die 132 can be directly attached to the tube 120, thereby eliminating a need for the relatively costly optional glass pedestal 138 fused on the die level during wafer fabrication. In alternative embodiments, such as in applications having very high accuracy demands, the optional glass pedestal 138 fused on the die level can be used to lower forces caused by a small coefficient of thermal expansion mismatch between the solder glass and the tube 120. In one embodiment the rigid seal has a thickness of about 20-80 micrometers.

The tube 120 can be attached to the mounting frame 105 using at least two methods. A first method uses a preform to seal the tube 120 to the mounting frame 105. A second method seals the tube 120 directly to the mounting frame 105. Coefficients of thermal expansion of the tube 120, MEMS die 132, and rigid seal 140 can all be within a predetermined range of coefficient of thermal expansion values. For example, materials can be selected such that differences in respective values can minimize thermal stress to increase accuracy and reliability. With such techniques, fluid pressure within an enclosure pressing on the tube 120 does not transfer this pressure to the MEMS die, but instead only fluid pressure through the conduit 121 creates pressure on the MEMS sensor 130. Fluid pressure on the tube 120 is received by the mounting frame 105 or flanges of the mounting frame, that is the force is transferred to the mounting frame 105.

In some embodiments, the mounting frame 105 defines a recessed opening, that is, recessed relative to the interior side 107 such that the recessed opening protrudes on/above the exterior side 109. The mounting frame 105 can include receiving flange 114 that compressively holds the tube 120 after manufacture. In one embodiment, two optional flanges 127 can contact the tube 120 such that fluid pressure cannot force the tube 120 through the opening 111. Note that other physical structures or configurations can be used such that the mounting frame 105 mechanically prevents the tube 120 from passing through (completely through) the opening 111. For example, other embodiments can have a mounting frame with a gradually narrowing opening that prevents tube passage. In other embodiments, the tube can be positioned on a generally flat interior side 107, with the mounting frame defining a ridge or other support structure partially surrounding the tube 120 to prevent lateral movement of the tube 120.

In another embodiment, the borosilicate tube can include a flange or other geometry improving the compression seal. This configuration can be used instead of or in conjunction with a similar corresponding flange feature in the mounting frame. Such a feature provides support for withstanding increased high burst pressures.

In another embodiment, the flanges 127 do not need to contact the top of the tube 124 or the flanges are not used at all. This can reduce stress transmitted to the MEMS sensor 130 caused by the mounting frame 105, here a metal mounting frame, shrinking more at lower temperatures than other components. In this embodiment, the compressive seal does not require the "overhang" of flange 127, and the seal is strong enough to keep the tube in place with pressures up to about 200 Bar.

In some embodiments, the tube 120 can include a portion that protrudes through the opening 111 such that the MEMS die 132 is attached outside of the opening 111. In other words, the MEMS die 132 is attached to the tube 120 such that the MEMS die is positioned slightly above the exterior side 109. In other embodiments, the tube 120 does not protrude through the opening 111, as shown in FIG. 1, and instead the MEMS die is positioned at least partially within the opening 111.

The pressure sensor device 100 can also include a printed circuit board (PCB) 150 connected to the MEMS sensor 130, as well as a support member (not shown) that attaches the printed circuit board 150, and associated structures, to the mounting frame 105. The PCB 150 can be used for signal processing and can include components to implement signal processing. Wire bonds or links can to electrically connect MEMS die 132 to PCB 150. The mounting frame 105 can be comprised of a metallic material such as metal or a metal alloy, and can be selected to match an enclosure material of a fluid-containing enclosure. The mounting frame 105 can be configured to attach to an automotive transmission, and the MEMS sensor 130 can be configured to monitor oil pressure within the automotive transmission. The MEMS sensor 130 and printed circuit board 150 can be calibrated to monitor changes in oil pressure from a dual clutch transmission system.

Figure 2:
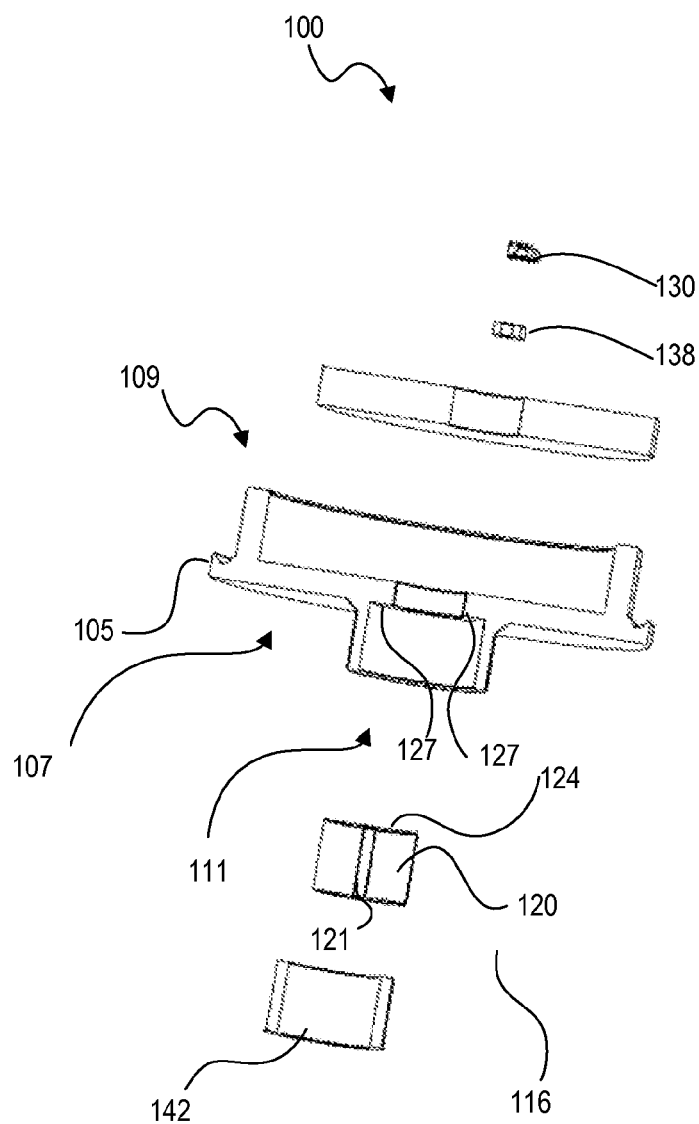
FIG. 2 is a perspective exploded view of example components of a pressure sensor according to embodiments herein.

FIG. 2 shows an exploded perspective view of the components from FIG. 1. Such an exploded view can show an example assembly arrangement. Techniques disclosed herein can include a method for assembling a pressure sensor for measuring pressure of a fluid, and a method for measuring pressure using such a pressure sensor. An example method for assembly includes providing a mounting frame 105 attachable to a pressure port of a fluid-containing enclosure. The mounting frame 105 has an interior side 107 for facing the fluid-containing enclosure. The mounting frame 105 has an exterior side 109 for facing away from the fluid-containing enclosure. The mounting frame 105 defines an opening 111 that extends from the interior side 107 to the exterior side 109. The tube 120 defines a fluid conduit 121 extending completely through the tube 120. The tube 120 is positioned such that the fluid conduit 121 and a surface area 124 of the tube 120, through which the fluid conduit exits, are accessible from the exterior side 109 of the mounting frame 105. Note in the exploded view that the tube 120 is assembled below the mounting frame 105, that is, the tube rests on the interior or oil facing side of the mounting frame 105, in other words, being inserted from the bottom. Optionally, the tube 120 is positioned at the opening 111 such that the tube contacts a portion of flanges 127 of interior side 107 of the mounting frame 105 such that the mounting frame 105 prevents the tube 120 from completely passing through the opening 111 from the interior side 107 to the exterior side 109.

In conventional pressure sensors, a MEMS die is bonded to a pedestal member, a metal alloy affixed to the exterior side of a mounting plate, requiring strong adhesive to keep the pedestal member from detaching from the mounting frame. The conventional pressure sensor has components which are thermally mismatched.

Either before or after the tube 120 is attached to the mounting frame 105, a microelectromechanical system (MEMS) die 130 is attached to the pedestal 138 at the surface area 124 of the tube 120 such that when the fluid conduit 121 is filled with fluid from the fluid-containing enclosure, the fluid presses against the MEMS die 132. The pressure sensor 100 can then monitor changes in fluid pressure and signal associated control systems, such as signaling a pump to increase pressure within the fluid-containing enclosure, or signaling a valve to release excess pressure. Attaching the tube 120 to the mounting frame 105 can be accomplished using a rigid seal 140 that prevents fluid from directly contacting the MEMs die 132 and prevents fluid from exiting the pressure sensor 100. Such a bonding process can be executed within an oven when using glass solder, frit or paste. The rigid seal 140 can include the thermal expansion properties as explained above. A bonding layer 116 is used to compressively retain the tube 120 within the recessed opening 111.

In one embodiment, the tube 120 is borosilicate (e.g., Pyrex®) glass and a low cost solder glass and sealing glass preform 142 is used to bond the tube 120 to the mounting frame 105. A high or medium temperature sealing glass (lead free or with small lead content) in conjunction with solder glass is used to hermetically seal the low cost borosilicate tube 120 to the mounting frame 105. The borosilicate tube 120 is compressively sealed using the glass preform 142 that has a firing temperature below the glass transition point (Tg) of borosilicate. A simple carbon fixture (not shown) is used to hold the preform in place during firing (i.e. heating) because glass does not stick to carbon. In addition to borosilicate other low expansion glass tube can be used.

In one embodiment, the borosilicate tube 120 is compressively sealed within the mounting frame 105 using the preform 142 which includes a low-expansion glass, for example, Ferro 7574 glass, which seals at medium of high temperature (between 600-750° C. and which seals well to borosilicate.

Depending on the required accuracy and the tolerated stresses on the MEMS die 132, the borosilicate pedestal 138 which is, for example anodically bonded to the MEMS die 132, can be omitted. Alternatively, the MEMS die 132 can be directly attached to the borosilicate tube 120 using solder glass to form a thermally matched seal.

The techniques described above form a thermally matched rigid seal (CTEs within about 30% of each other) between the borosilicate tube 120 and the MEMS die 132 in part obtained by using solder glass. In one embodiment, the firing temperature for the assembly is approximately 450° C. which is much lower than the firing temperature of the glass preform 142 used for the compression seal. In one embodiment the solder glass can be applied using a paste and screen printing or dispensing techniques on the top flat surfaces of the MEMS die 132 and/or the borosilicate tube 120. The solder glass is not permeable or sensitive to solvents like ethanol or methanol, while epoxies are. Due to the use of the borosilicate tube, the silicon MEMS die 132 can directly be attached to the tube, eliminating the need for the optional and expensive glass pedestal 138 on die level. In case of high accuracy demands, the glass pedestal 138 is optionally used to lower the forces caused by CTE mismatch between the solder glass and the silicon.

Materials can be selected such that the CTE difference between the MEMS die 132 and the borosilicate tube 120 is less than about 0.075 ppm/(degrees) K. For example, in one embodiment, borosilicate tube 120 is Pyrex® 7740 borosilicate glass with a CTE of about 3.25, the solder glass and the MEMS die CTE is about 2.5. In this example the maximum CTE difference between the components is about 0.75 ppm/K or about 30%.

In contrast, in conventional devices, Alloy 42 has a CTE of about 4.9 ppm/K and a more expensive metal like Kovar has a CTE of about 4.5 ppm/K providing differences with the MEMS 2.5 CTE of about 2.4 ppm/K and 2 ppm/K and percentage differences of about 96% and about 80%, respectively. When the seal layer is thicker than 200 um, the CTE of the seal is a factor. With a thicker seal layer, the CTE value of the rigid seal 140 is about 3.0 ppm/K. When using a pedestal, the CTE of MEMS die 132, rigid seal 140 and borosilicate tube 120 should have a maximum difference of 2.0 ppm/K.

In one embodiment, a borosilicate green state preform is used for compressively sealing into the mounting frame. Materials for the mounting frame include, but are not limited to: ceramics or metal (e.g., Kovar, Invar or alloy 42. One advantage of using a green state preform compared to using a sintered preform is that certain process steps can be eliminated (e.g., several sintering/firing steps) or steps can be combined into one oven profile.

Figure 3:
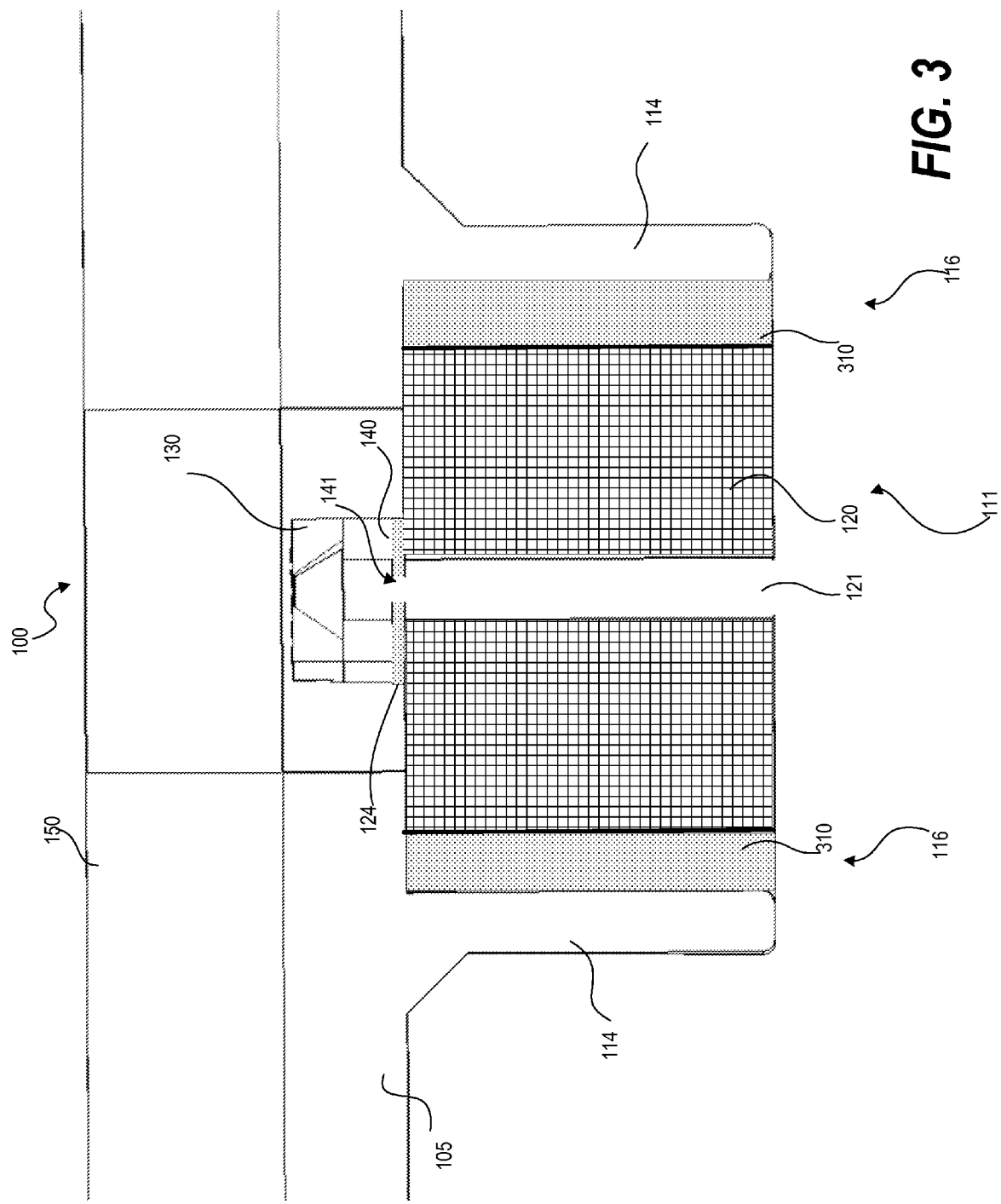
FIG. 3 is a cross-sectional side view of the bond between components of the pressure sensor of FIG. 1.

Referring now to FIG. 3, a bonding layer 116 between components of the pressure sensor of FIG. 1 includes a solder glass layer 310 disposed adjacent a portion of the borosilicate tube 120 and a portion of the flange 114 of the mounting frame sidewall 105. The glass preform 142 is initially placed between the mounting frame 105 and borosilicate tube 120 and held in place by fixtures (e.g., carbon fixtures). During firing, the fixtures prevent glass from flowing out of the volume between the mounting frame 105 and borosilicate tube 120. Alternatively, coatings of solder glass can be applied to each of the borosilicate tube 120 and the mounting frame 105. In some embodiments, the formation of the rigid seal 140 and the bonding layer 116 (compressive seal) can be accomplished in the same oven step by using identical or similar glass compositions.

In other embodiments, a lower CTE solder glass can be used for the bonding layer 130, however in these embodiments the geometry and/or the composition of the mounting frame 105 is tuned in order to maintain the compression forces within a predetermined target zone to avoid excessive compression. In some embodiment, the use of preforms is preferred to avoid trapped glass bubbles caused by entrapped binders in paste or frits.

Figure 4:
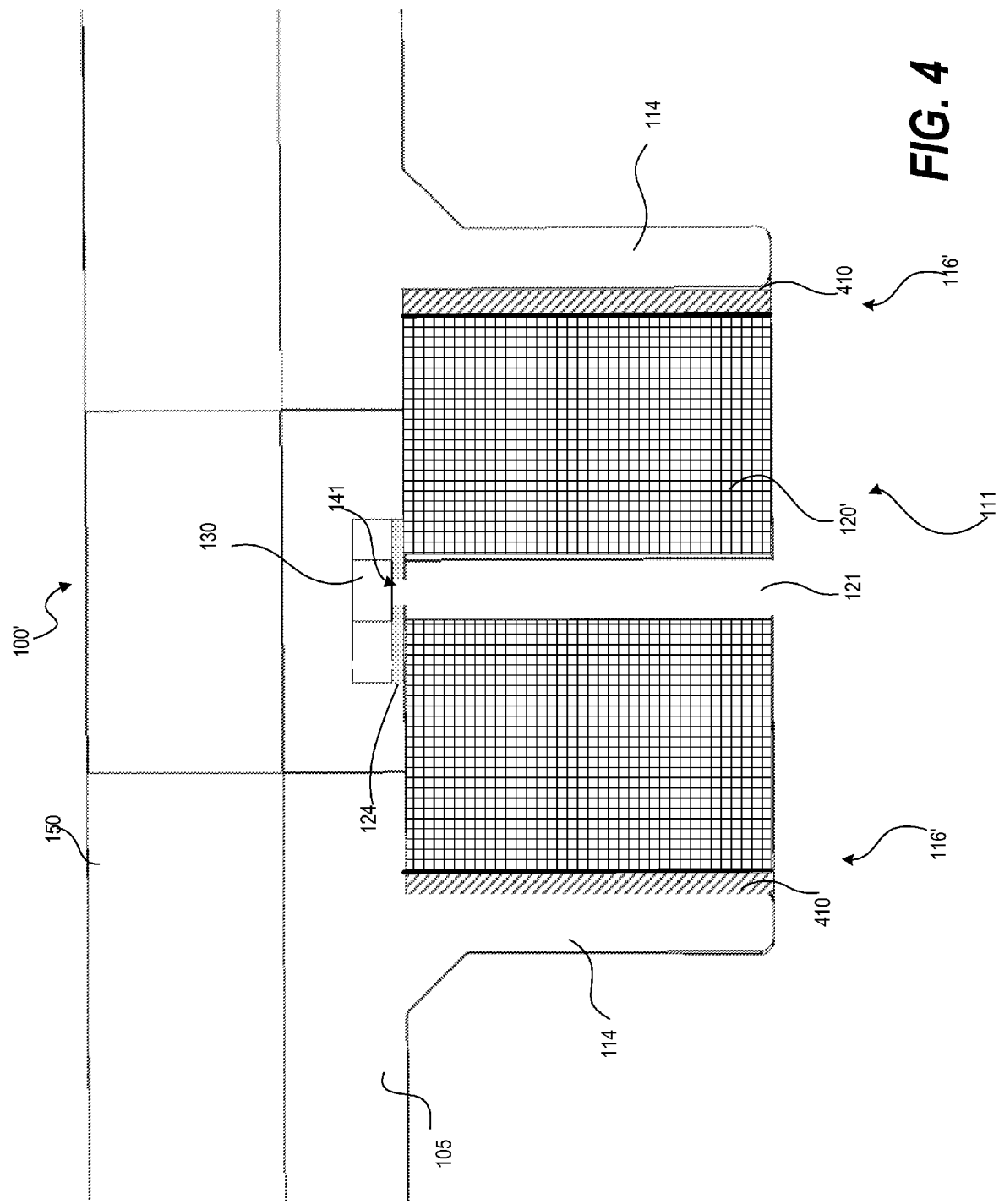
FIG. 4 is a cross-sectional side view of an alternative pressure sensor according to embodiments herein according to embodiments herein.

Referring now to FIG. 4, a pressure sensor 100' similar to the sensor 100 of FIG. 1 is shown. In this embodiment a borosilicate tube 120' comprises a sintered or greenstate preform. In this embodiment a low cost connection between the borosilicate tube 120' and the metal mounting frame 105 is formed during firing. At temperatures of approximately 800° C., the glass the borosilicate tube 120' softens and an hermetic seal/compression seal 410 is formed between portions of the mounting frame 105 and the borosilicate tube 120'. When the assembly cools down, the borosilicate tube 120' solidifies and the larger coefficient of thermal expansion (CTE) of the mounting frame 105, here stainless steel (with a CTE of about 11) ensures compression of the borosilicate tube 120'. Here there is no additional glass layer between the borosilicate tube 120' solidifies and the mounting frame 105.

In some embodiments, the mounting frame 105 comprises alloy 42 or Kovar with CTEs of about 4.9 and 4.5 respectively. In other words, the tube is compressively sealed to the mounting frame because the coefficient of thermal expansion of the tube is lower that the mounting frame. One benefit of the glass seal that is under compression is that it is highly resistant against crack formation.

During firing (i.e. heating the assembled borosilicate tube 120' and mounting frame 105 to a temperature above the glass transition temperature of the borosilicate tube 120), the borosilicate tube 120' shape and fluid conduit 121 is maintained by carbon fixtures (not shown). The carbon fixture ensures the conduit 121 does not close. The high firing temperature and difference in thermal expansion properties of the mounting frame 105 and the borosilicate tube 120' forms the compression glass seal. In one embodiment, a steel like AISI 430 or a low-cost Nickel plated carbon-steel can be used, but if lower compression levels are desired, a metal Alloy 42 (CTE 4.9 ppm/K) or a more expensive metal like Kovar (CTE 4.5 ppm/K) can be used. In one embodiment, the compression seal 410 is about 0.1 to 0.3 mm.

Those skilled in the art will also understand that there can be many variations made to the operations of the techniques explained above while still achieving the same objectives of the invention. Such variations are intended to be covered by the scope of this invention. As such, the foregoing descriptions of embodiments of the invention are not intended to be limiting. Rather, any limitations to embodiments of the invention are presented in the following claims.

The invention claimed is:

1. A pressure sensor device attachable to a pressure port of a fluid-containing enclosure for measuring pressure of a fluid, the pressure sensor device comprising:
   a pressure port mounting frame the mounting frame having an interior side for facing the fluid-containing enclosure, the mounting frame having an exterior side for facing away from the fluid-containing enclosure, the mounting frame defining an opening that extends from the interior side to the exterior side, the mounting frame having a sidewall on the interior side;
   a tube, the tube defining a fluid conduit extending completely through the tube, the tube positioned such that the fluid conduit and a surface area of the tube, through which the fluid conduit exits, are accessible from the exterior side of the mounting frame;

a microelectromechanical system (MEMS) sensor sealed to the tube at a surface area of the tube such that when the fluid conduit is filled with fluid from the fluid-containing enclosure, the fluid presses against the MEMS sensor; and an hermetic seal formed by compressively sealing the tube to the portion of the interior side of the mounting frame.

2. The pressure sensor device of claim 1, further comprising a rigid seal disposed between a portion of the MEMS sensor and a portion of the tube adjacent to the MEMS sensor, wherein the rigid seal has an opening such that the fluid contacts a portion of the MEMS sensor and the rigid seal prevents fluid from exiting the pressure sensor.

3. The pressure sensor device of claim 2, wherein the rigid seal comprises solder glass.

4. The pressure sensor device of claim 3, wherein the tube has a first coefficient of thermal expansion, the MEMS sensor has a second coefficient of thermal expansion, and the rigid seal has a third coefficient of thermal expansion; and
wherein the first, second and third coefficients of thermal expansion are within about 0.75 ppm/K of each other.

5. The pressure sensor device of claim 4, wherein the hermetic seal has a fourth coefficient of thermal expansion; and
wherein the first, second, third and fourth coefficients of thermal expansion are within about 0.75 ppm/K of each other.

6. The pressure sensor device of claim 3, wherein the MEMS sensor comprises:
a MEMS die bonded to a pedestal, the bond selected from the group consisting of:
a solder glass bond;
a eutectic bond;
a fusion bond; and
an anodic bond; and
wherein the pedestal is attached to the tube using the rigid seal.

7. The pressure sensor device of claim 1, further comprising a melted glass layer disposed between a portion of the tube and a portion of the mounting frame sidewall.

8. The pressure sensor device of claim 1, further comprising a bonding layer disposed between a portion of the tube and a portion of the mounting frame sidewall, the bonding layer comprising a thermally processed solder glass preform layer disposed between the portion of the tube and the portion of the mounting frame sidewall.

9. The pressure sensor device of claim 8, wherein the tube has a first coefficient of thermal expansion, the MEMS sensor has a second coefficient of thermal expansion and the solder glass layer has a third coefficient of thermal expansion and
wherein the first, second and third coefficients of thermal expansion are within about 0.75 ppm/K of each other.

10. The pressure sensor device of claim 1, further comprising a bonding layer disposed between a portion of the tube and a portion of the mounting frame sidewall, the bonding layer comprising:
a thermally processed frit paste layer disposed between the portion of the tube and the portion of the mounting frame sidewall.

11. The pressure sensor device of claim 1, wherein the tube is comprised of glass.

12. The pressure sensor device of claim 11, wherein the glass tube is comprised of borosilicate glass.

13. The pressure sensor device of claim 1, further comprising:
a printed circuit board connected to the MEMS die; and
a support member that attaches the printed circuit board to the mounting frame.

14. The pressure sensor device of claim 13, wherein the mounting frame is comprised of a metallic material.

15. The pressure sensor device of claim 14, wherein the mounting frame is configured to attach to an automotive transmission, and wherein the MEMS sensor is configured to monitor oil pressure within the automotive transmission.

16. The pressure sensor device of claim 14, wherein the MEMS sensor is calibrated to monitor changes in oil pressure from a dual clutch transmission system.

17. The pressure sensor device of claim 1, wherein the mounting frame further comprising flanges on interior side of the mounting frame and wherein a portion of the tube is positioned at the opening and being in contact with a portion of the flanges.

18. A method for assembling a pressure sensor for measuring pressure of a fluid, the method comprising:
providing a mounting frame attachable to a pressure port of a fluid-containing enclosure, the mounting frame having an interior side for facing the fluid-containing enclosure, the mounting frame having an exterior side for facing away from the fluid-containing enclosure, the mounting frame defining an opening that extends from the interior side to the exterior side;
positioning a tube at the opening, the tube defining a fluid conduit extending completely through the tube, the tube positioned such that the fluid conduit and a surface area of the tube, through which the fluid conduit exits, are accessible from the exterior side of the mounting frame;
compressively sealing the tube to the mounting frame forming a hermetic seal between the MEMS sensor and fluid-containing enclosure; and
sealing a microelectromechanical system (MEMS) sensor to the tube at the surface area of the tube such that when the fluid conduit is filled with fluid from the fluid-containing enclosure, the fluid presses against the MEMS sensor.

19. The method of claim 18, wherein the mounting frame further comprising flanges on interior side of the mounting frame and further comprising positioning a portion of the tube at the opening in contact with a portion of the flanges.

20. The method of claim 18, wherein compressively bonding the tube to the mounting frame further comprises heating the assembled tube and mounting frame to a temperature above the glass transition temperature of the tube; and
wherein the coefficient of thermal expansion of the tube is lower than the mounting frame.

21. The method of claim 20, wherein sealing the MEMS sensor to the tube further comprises:
forming a rigid seal disposed between a portion of the MEMS sensor and a portion of the tube adjacent to the MEMS sensor, wherein the rigid seal has an opening such that the fluid contacts a portion of the MEMS sensor and the rigid seal prevents fluid from exiting the pressure sensor;
wherein the tube has a first coefficient of thermal expansion, the MEMS sensor has a second coefficient of thermal expansion, and the rigid seal has a third coefficient of thermal expansion; and
wherein the first, second and third coefficients of thermal expansion are within about 0.75 ppm/K of each other.

22. The method of claim 18, wherein compressively sealing the tube to the mounting frame further comprises:
placing a compressive seal between the tube and mounting frame and
heating the assembled tube, mounting frame and compressive seal to a temperature above the melting point of the preform.

23. The method of claim 22, further comprising attaching the MEMS sensor to the tube with a solder glass preform forming a rigid seal before heating.

24. The method of claim 23, wherein the tube has a first coefficient of thermal expansion, the MEMS die has a second coefficient of thermal expansion and the rigid seal has a third coefficient of thermal expansion; and
   wherein the first, second and third coefficients of thermal expansion are within about 0.75 ppm/K of each other.

25. The method of claim 22, wherein the compressive seal is one of:
   a sintered glass preform;
   a green state preform; and
   a frit paste.

26. The method of claim 22, wherein the MEMS sensor comprises:
   a MEMS die bonded to a pedestal, the bond selected from the group consisting of a solder glass bond and an anodic bond; and
   the pedestal is attached to the tube using the rigid seal.

\* \* \* \* \*